(12) United States Patent
Tsuchiya et al.

(10) Patent No.: US 7,518,851 B2
(45) Date of Patent: Apr. 14, 2009

(54) DISTRIBUTION SWITCHGEAR

(75) Inventors: Kenji Tsuchiya, Hitachi (JP); Yoshinori Nishizawa, Hitachi (JP); Yuko Kajiyama, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/774,786

(22) Filed: Jul. 9, 2007

(65) Prior Publication Data
US 2008/0007896 A1   Jan. 10, 2008

(30) Foreign Application Priority Data
Jul. 10, 2006   (JP) ............................. 2006-189159

(51) Int. Cl.
*H02B 1/20* (2006.01)

(52) U.S. Cl. .................... 361/611; 174/72 B; 361/623; 361/624; 361/639; 361/605; 361/606

(58) Field of Classification Search ......... 361/601–603, 361/605–606, 608, 611, 614, 620, 622–624; 200/50.21, 50.23
See application file for complete search history.

(56) References Cited

U.S. PATENT DOCUMENTS

| | | | | |
|---|---|---|---|---|
| 3,967,165 A | * | 6/1976 | Olashaw et al. | 361/622 |
| 4,136,374 A | * | 1/1979 | Rosey et al. | 361/614 |
| 4,249,227 A | * | 2/1981 | Kato et al. | 361/622 |
| 4,504,885 A | * | 3/1985 | Yoshikawa et al. | 361/614 |
| 4,660,012 A | * | 4/1987 | Bonniau et al. | 335/234 |
| 4,677,524 A | * | 6/1987 | Shiraishi et al. | 361/605 |
| 4,713,642 A | * | 12/1987 | Wolfe et al. | 336/92 |
| 5,124,881 A | * | 6/1992 | Motoki | 361/605 |
| 5,450,280 A | * | 9/1995 | Wactor | 361/606 |
| 5,539,614 A | * | 7/1996 | Ishikawa et al. | 361/620 |
| 5,648,888 A | * | 7/1997 | Le Francois et al. | 361/603 |
| 6,339,192 B1 | * | 1/2002 | Hashimoto | 174/72 B |
| 7,286,337 B2 | * | 10/2007 | Masuhara et al. | 361/620 |
| 2006/0034025 A1 | * | 2/2006 | Masuhara et al. | 361/42 |

FOREIGN PATENT DOCUMENTS

| | | |
|---|---|---|
| JP | 7-11813 | 2/1995 |
| JP | 2003-189422 | 7/2003 |

* cited by examiner

*Primary Examiner*—Gregory D Thompson
(74) *Attorney, Agent, or Firm*—Mattingly, Stanger, Malur & Brundidge, PC (57) ABSTRACT

A distribution switchgear has an equipment room, main busbar room and cable room, which are formed in a distribution panel housing by partitioning the housing, from front to back such that the equipment room is located just behind the front door of the housing, with the busbar room behind the equipment room. In the equipment room are disposed a circuit breaker, a current transformer on a load side of the circuit breaker and a zero-phase-sequence current transformer on a power supply side of the circuit breaker. The equipment units are vertically arranged in the equipment room. In the busbar room are a solid-insulated main busbar, a solid-insulated link busbar connected with the main busbar and connected with one side of each of the equipment units and a solid-insulated branch busbar connected with the other side of each of the equipment units.

24 Claims, 12 Drawing Sheets

DISTRIBUTION SWITCHGEAR

CLAIM OF PRIORITY

The present application claims priority from Japanese application serial No. 2006-189159, filed on Jul. 10, 2006, the content of which is hereby incorporated by reference into this application.

DESCRIPTION OF THE INVENTION

1. Field of the Invention

The present invention relates to distribution switchgear, and more particularly to distribution switchgear in which a circuit breaker, a current transformer, a zero-phase-sequence current transformer and so on are disposed in series.

2. Background Art

One example of distribution switchgear is a unit comprised of a circuit breaker, a current transformer (CT) and a zero-phase-sequence current transformer which are connected in series, where the unit moves on a rail or the unit placed on a carriage is housed in a power distribution panel in a way that it can be drawn out from the power distribution panel (for example, see Patent Documents 1 and 2).

[Patent Document 1] JP-U No.H7-11813
[Patent Document 2] JP-A No. 2003-189422

SUMMARY OF THE INVENTION

Since the conventional distribution switchgear is compact and features good maintainability as a unit constituting distribution switchgear, it has been used in various systems. It has been found from its use in various systems that the distribution switchgear has to be improved in several points.

The first point to be improved is as follows: in the conventional distribution switchgear, although a zero-phase-sequence current transformer is located on the load side of the circuit breaker to detect a ground fault on the load side of the circuit breaker, there is no means for ground fault protection of the whole load side including a circuit breaker located on the power supply side of the zero-phase-sequence current transformer.

Besides, there is room for improvement to assure maintainability of a busbar connected with the distribution switchgear and extended service life of the distribution switchgear; therefore, it is not ideal for its user as the case stands now.

The present invention has been made based on the above circumstances and its object is to provide a distribution switchgear which not only protects the whole load side including a circuit breaker against ground faults to widen the protection range and thus increases reliability but also can achieve labor saving in maintenance and a longer service life.

To provide a distribution switchgear which protects the whole load side including a circuit breaker against ground faults to widen the protection range and thereby increases its reliability and can achieve labor saving in maintenance and longer service life.

DESCRIPTION OF REFERENCE NUMERALS

1 . . . Housing, 2 . . . Partition plate, 3 . . . Partition plate, 4 . . . Equipment room, 5 . . . Main busbar room, 6 . . . Cable room, 7 . . . Front door, 8 . . . Protective control unit, 9 . . . Back door, 10 . . . Vacuum circuit breaker, 11 . . . Current transformer, 12 . . . Zero-phase-sequence current transformer, 13 . . . Surge absorber, 14 . . . Equipment unit, 15 . . . Carriage, 16 . . . Guide, 17 . . . Handle, 18 . . . Terminal, 19 . . . Terminal, 20 . . . Main busbar, 21 . . . Link busbar, 23 . . . Cable sealing end, 24 . . . Cable, 25 . . . Connecting terminal, 26 . . . Connecting terminal, 27 . . . Air disconnection bushing, 28 . . . Air disconnection bushing, 29 . . . Branch busbar, 30 . . . Branch busbar, 31 . . . Connecting terminal, 32 . . . Air disconnection bushing, 33 . . . Connecting terminal, 34 . . . Air disconnection bushing, 35 . . . Connecting busbar, 36 . . . Common room, 80 . . . Disconnecting part, 81 . . . Voltage transformer, 82 . . . Lightning protector, 84 . . . Auxiliary link busbar, 90 . . . Vacuum circuit breaker.

DETAILED DESCRIPTION OF THE PREFERRED EMBODIMENTS

In an example of the switchgear of the present invention, an equipment room 4 and a main busbar room 5 are formed in a distribution panel housing 1 on its front side and on its back side respectively by partitioning; in the equipment room 4, equipment units 14, each comprised of a vacuum circuit breaker 10, a current transformer 11 on the load side of the vacuum circuit breaker 10 and a zero-phase-sequence current transformer 12 on the power supply side of the vacuum circuit breaker 10, are vertically disposed; and in the main busbar room 5, a solid-insulated main busbar 20 disposed along the housing 1's width direction, a solid-insulated link busbar 21 connected with the main busbar and connected with one side of each of the equipment units 14 and solid-insulated branch busbars 29, 30 connected with the other side of the equipment units 14 are disposed.

In order to achieve the above object, distribution switchgear according to the present invention is characterized in that an equipment room and a main busbar room are formed in a distribution panel housing on its front side and on its back side respectively by partitioning; in the equipment room, equipment units, each comprised of a circuit breaker, a current transformer on a load side of the circuit breaker and a zero-phase-sequence current transformer on a power supply side of the circuit breaker, are vertically disposed; and in the main busbar room, a solid-insulated main busbar disposed along the housing's width direction, a solid-insulated link busbar connected with the main busbar and connected with one side of each of the equipment units and a solid-insulated branch busbar connected with the other side of each of the equipment unit are disposed, or characterized by comprising an array of panels disposed side by side in a housing which are a first panel in which two equipment units each comprised of a circuit breaker, a current transformer on a load side of the circuit breaker and a zero-phase-sequence current transformer on a power supply side of the circuit breaker are vertically disposed, a second panel in which an equipment unit comprised of a circuit breaker, a current transformer on a load side of the circuit breaker and a zero-phase-sequence current transformer on a power supply side of the circuit breaker, and a voltage transformer unit having a voltage transformer are vertically disposed, and a third panel in which a voltage transformer unit having a voltage transformer and a lightning protector and a disconnector unit having a disconnector are vertically disposed, wherein these panels are interconnected by a solid-insulated main busbar disposed along the housing's width direction, a solid-insulated link busbar connected with one side of each of the units and a branch busbar connected with the other side of each of the units.

To provide distribution switchgear which protects the whole load side including a circuit breaker against ground faults to widen the protection range and thereby increases its reliability and can achieve labor saving in maintenance and longer service life.

An equipment room 4 and a main busbar room 5 are formed in a distribution panel housing 1 on its front side and on its back side respectively by partitioning; in the equipment room 4, equipment units 14, each comprised of a vacuum circuit breaker 10, a current transformer 11 on the load side of the vacuum circuit breaker 10 and a zero-phase-sequence current transformer 12 on the power supply side of the vacuum circuit breaker 10, are vertically disposed; and in the main busbar room 5, a solid-insulated main busbar 20 disposed along the housing 1's width direction, a solid-insulated link busbar 21 connected with the main busbar and connected with one side of each of the equipment units 14 and solid-insulated branch busbars 29, 30 connected with the other side of the equipment units 14 are disposed.

According to distribution switchgear in the present invention, since a zero-phase-sequence current transformer is located on the power supply side of a circuit breaker constituting an equipment unit, the whole load side including the circuit breaker can be protected against ground faults to widen the protection range and thereby increase reliability, and also since a solid-insulated main busbar is housed in a main busbar room separate from an equipment room housing equipment units, labor saving in maintenance and longer service life can be achieved.

Next, distribution switchgear according to embodiments of the present invention will be described referring to drawings.

First Embodiment

Figure 1:
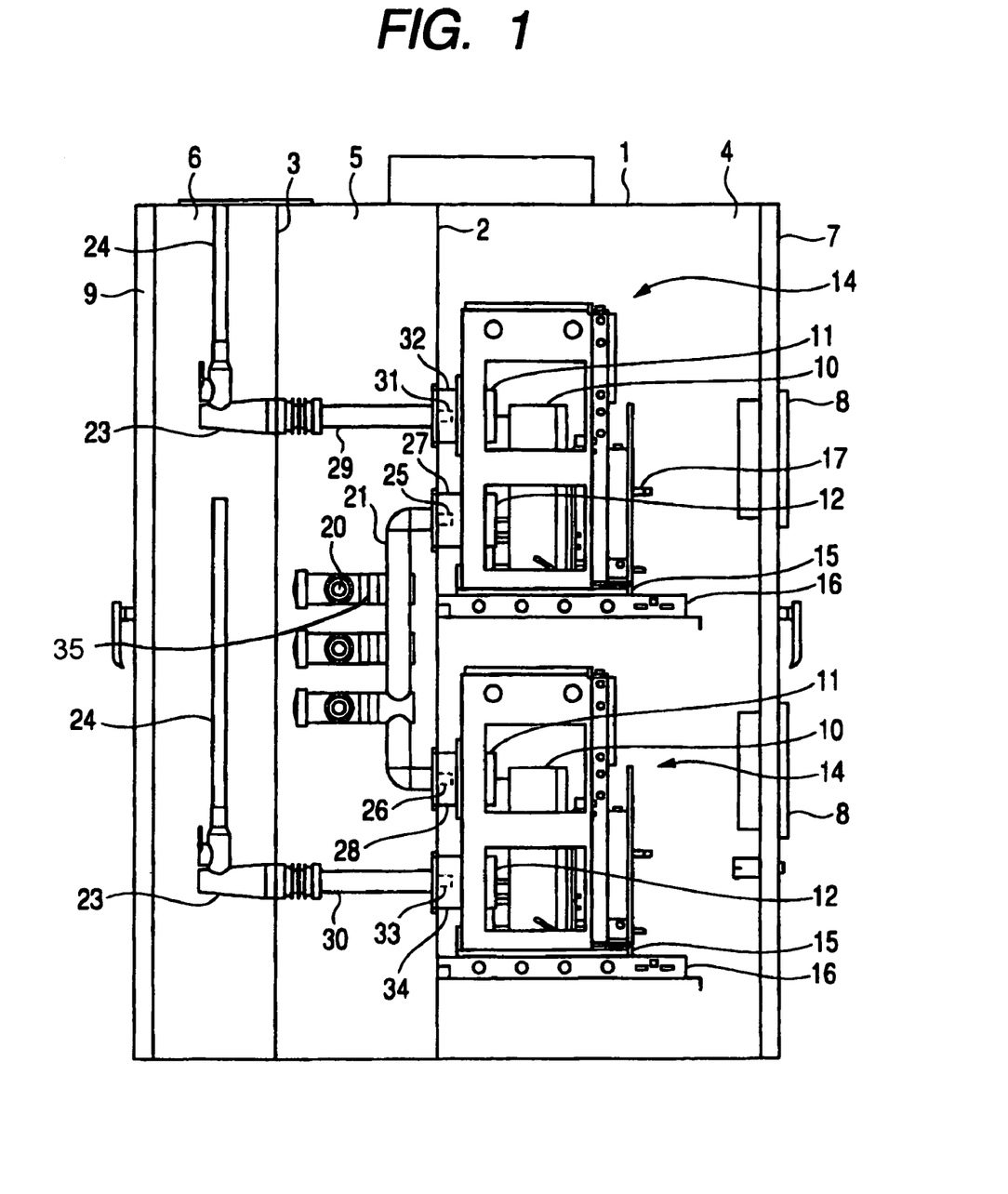
FIG. 1 is a longitudinal sectional view of a distribution switchgear according to a first embodiment of the present invention.
Figure 2:
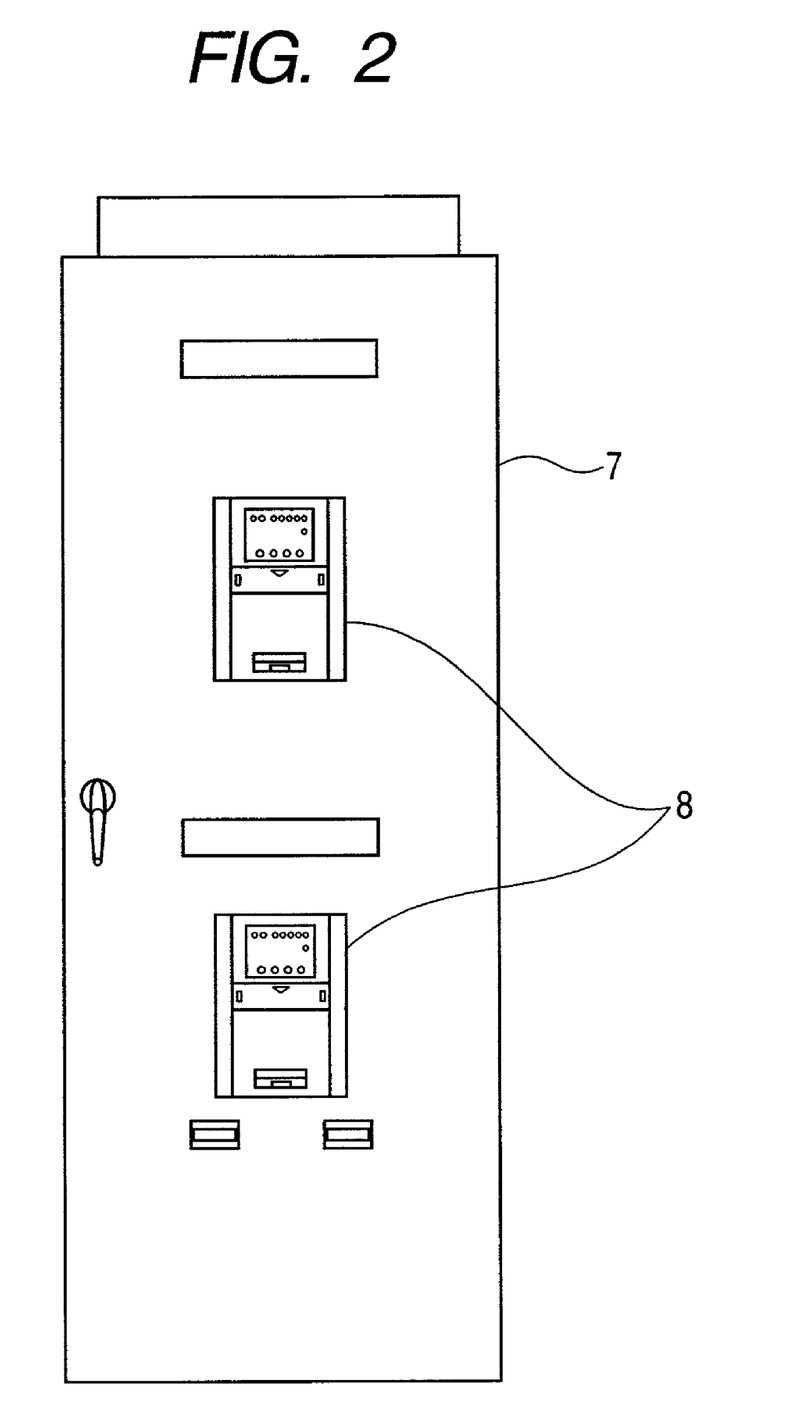
FIG. 2 is a front view showing the distribution switchgear shown in FIG. 1 according to the present invention.
Figure 3:
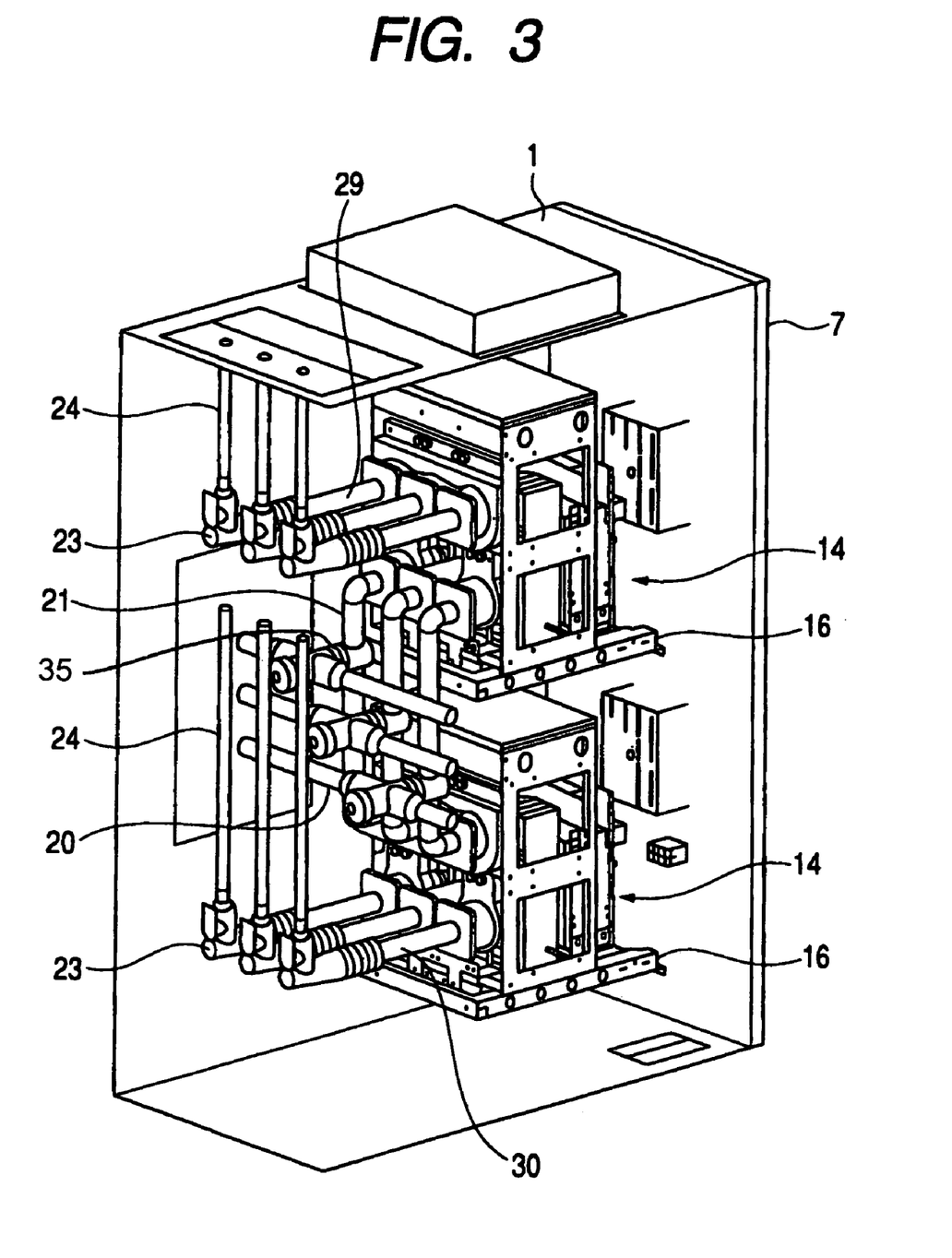
[FIG. 3] is a partially sectional perspective view showing the distribution switchgear shown in FIG. 1 according to the present invention.
Figure 4:
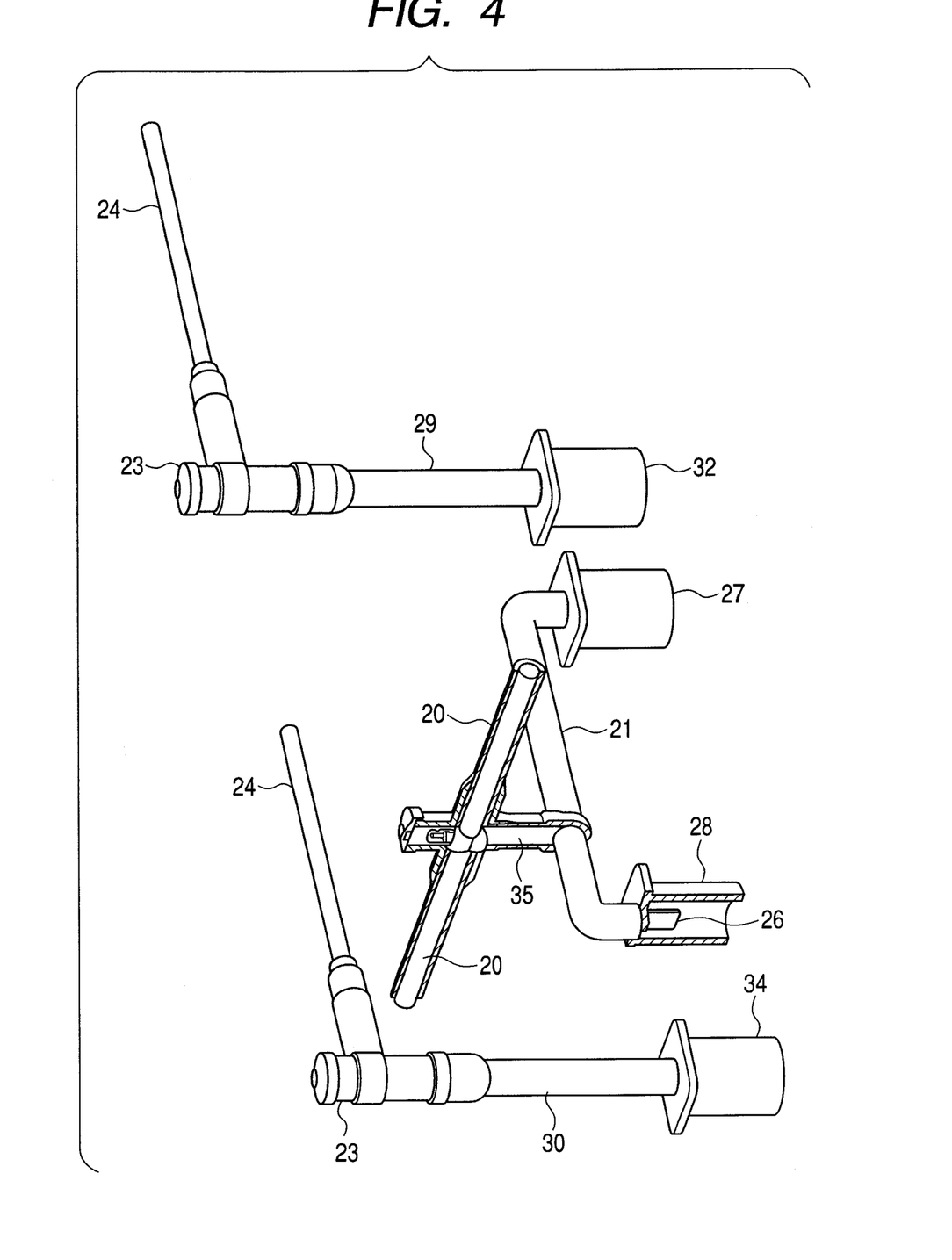
FIG. 4 is an enlarged perspective view showing a main busbar part constituting the distribution switchgear shown in FIG. 1 according to the present invention.
Figure 5:
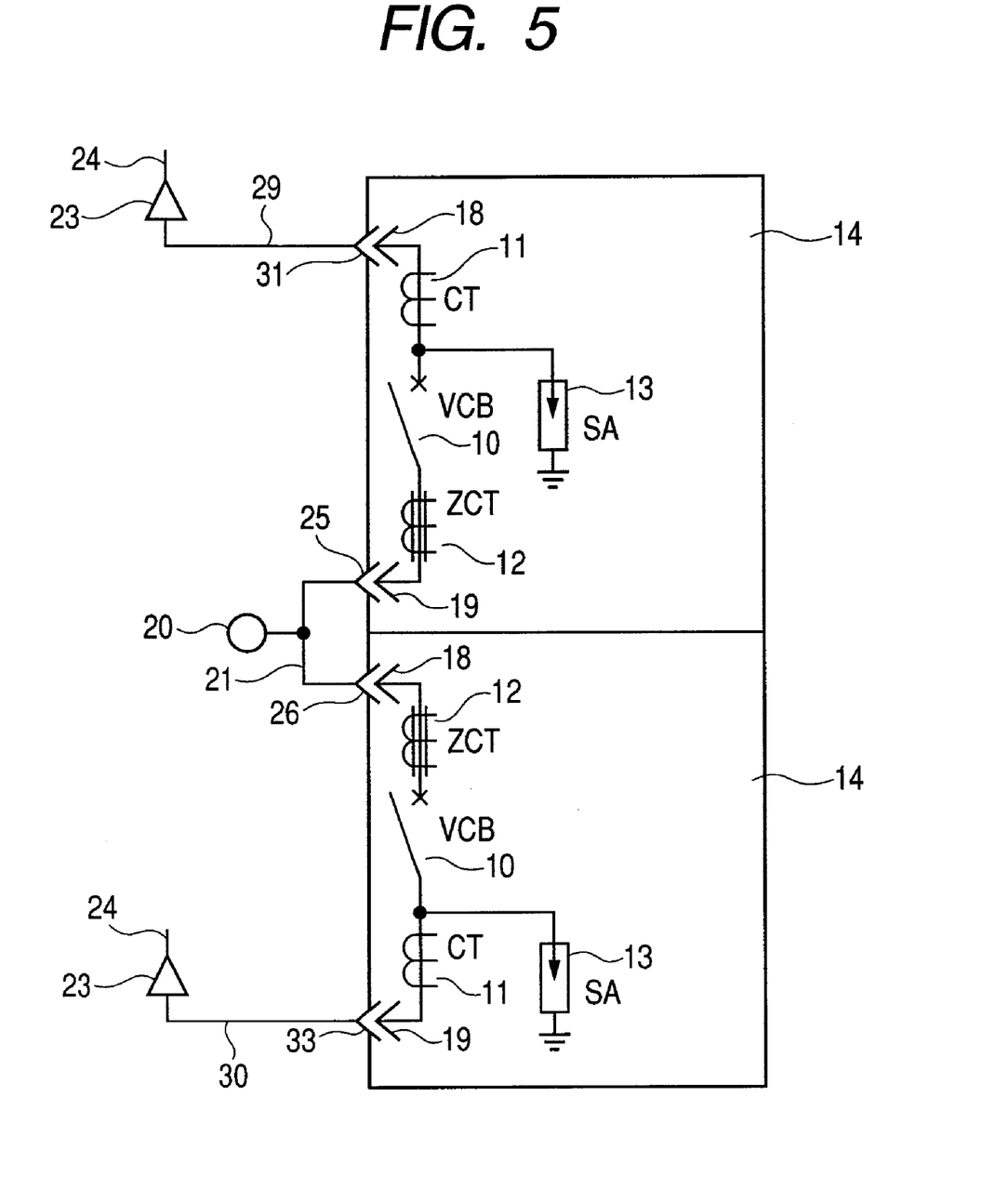
FIG. 5 is a general connection diagram of the distribution switchgear shown in FIG. 1 according to the first embodiment of the present invention.

FIGS. 1 to 5 show distribution switchgear according to a first embodiment of the present invention, in which FIG. 1 is a longitudinal sectional view of distribution switchgear according to an embodiment of the invention, FIG. 2 is a front view of it, FIG. 3 is a partially sectional perspective view of the distribution switchgear shown in FIG. 1 according to an embodiment of the invention, FIG. 4 is an enlarged perspective view showing a main busbar of the distribution switchgear shown in FIG. 1 according to an embodiment of the invention, and FIG. 5 is a general connection diagram of distribution switchgear according to an embodiment of the invention.

In FIGS. 1 to 3, the inside of a housing 1 of the distribution switchgear is partitioned by partition plates 2, 3 so that an equipment room 4, a main busbar room 5 and a cable room 6 are formed in order from the front side (right in the figure). As shown in FIGS. 1 and 2, a front door 7 is provided on the front of the housing 1 in an openable/closable manner. A digital protective control unit 8 is mounted on the door 7. A back door 9 is provided on the back of the housing 1 in an openable/closable manner as shown in FIG. 1.

Inside the equipment room 4, equipment units 14 are disposed vertically, where they are comprised of vacuum circuit breakers (VCB) 10 arranged side by side along the width direction of the housing 1 (orthogonal to the paper surface of FIG. 1), current transformers (CT) 11 provided respectively on the load side of the vacuum circuit breakers 10, zero-phase-sequence current transformers (ZCT) 12 provided respectively on the power supply side of the vacuum circuit breakers 10, and surge absorbers (SA) 13 for protection against external lightning surge (see FIG. 5).

These equipment units 14 can be drawn out toward the front of the housing 1 (right in FIG. 1) by means of carriages 15 at their bottom and guides 16 which guide the carriages 15. These equipment units 14 are usually fixed by lock devices (not shown) and when drawing them frontward, they can be drawn frontward by unlocking the lock devices (not shown) and pulling handles 17 on the front of the equipment units 14. This means that in the worst case, the equipment can be replaced easily with minimized replacement time.

The vacuum circuit breaker 10, current transformer 11, and zero-phase-sequence current transformer 12 which constitute an equipment unit 14 as mentioned above are connected in series as shown in FIG. 5. The zero-phase-sequence current transformer 12 is located on the power supply side of the vacuum circuit breaker 10 and the current transformer 11 is located on the load side of the vacuum circuit breaker 10 and the surge absorber 13 for protection against external lightning surge is connected on the load side of the vacuum circuit breaker 10. The current transformer is of the multi current ratio type which can cope with plural rated currents, contributing to increased reliability.

The opening/closing mechanism of the above vacuum circuit breaker 10 is an electromagnetic operating device which combines an electromagnet and a permanent magnet and uses a solid lubricating bearing in the sliding part of the mechanism, permitting easy greaseless maintenance.

As shown in FIG. 5, a terminal 18 connected with the fixed electrode side of a vacuum circuit breaker 10 and a terminal 19 connected with the movable electrode side of the vacuum circuit breaker are disposed in the back of each equipment unit 14; more particularly in each of the upper and lower equipment units 14, the terminal 18 is in an upper position and the terminal 19 is below it. These terminals 18, 19 are connected with a link busbar 21 connected with the main busbar 20 in the main busbar room 5 (stated later), and branch busbars 29, 30 through air bushing in a connectable/disconnectable manner. In FIG. 5, reference numeral 23 represents a cable sealing end and reference numeral 24 represents a cable.

Looking back to FIGS. 1 and 3, the solid-insulated main busbar 20 is disposed midway in the height direction of the housing 1 along the width direction of the housing 1 in the main busbar room 5. One end of the solid-insulated link busbar 21 is connected with the main busbar 20. The other end of the link busbar 21 is bifurcated and one connecting terminal 25 of it is led into the equipment room 4 in a way that it can be connected to, or disconnected from, the above upper equipment unit 14, and the other terminal 26 is led into the equipment room 4 in a way that it can be connected to, or disconnected from, the above lower equipment unit 14. These connecting terminals 25, 26 are fixed on the partition plate 2 through air disconnection bushings 27, 28, respectively.

The solid-insulated branch busbars 29, 30 are disposed in the upper and lower portions of the main busbar room 5, respectively. One connecting terminal 31 of the upper branch busbar 29 is led into the equipment room 4 in a way that it can be connected to, or disconnected from, the terminal 18 of the above upper equipment unit 14, and fixed on the partition plate 2 through an air disconnection bushing 32. The other end of the upper branch busbar 29 is connected with a cable sealing end 23 fixed on the partition plate 3.

One connecting terminal 33 of the lower branch busbar 30 is led into the equipment room 4 in a way that it can be connected to, or disconnected from, the terminal 19 of the above lower equipment unit 14, and fixed on the partition plate 2 through an air disconnection bushing 34. The other end of the lower branch busbar 30 is connected with a cable sealing end 23 fixed on the partition plate 3. The cable sealing ends 23 in the cable room 6 are each connected with a solid-insulated cable 24.

FIG. 4 shows details of connections of the main busbar 20, link busbar 21, and branch busbars 29, 30. In the figure, the partition plates 2, 3 are omitted. In FIG. 4, those designated by the same reference numerals as in FIG. 1 are the same elements and detailed descriptions thereof are omitted; however, it should be noted that the main busbar 20 and link busbar 21 are connected, for example, by a connecting busbar 35 which has one end connected with the link busbar 21 and the other end clamped to the main busbar 20. This arrangement is made taking into assembly and disassembly of these into consideration. The main busbar 20, link busbar 21, branch busbars 29, 30 and so on have earthed layers as a safety measure against electric shock, etc. and they are maintenance-free, or labor-saving in maintenance. Insulators on the main busbar 20, link busbar 21, branch busbars 29, 30 and so on are made of epoxy resin, silicon rubber, EP rubber or the like, and are formed by injecting such material into a die.

Next, how the above distribution switchgear according to the first embodiment of the present invention works will be described.

In this embodiment, since the current transformer 11 located on the load side of the vacuum circuit breaker 10 and the zero-phase-sequence current transformer 12 located on the power supply side of the vacuum circuit breaker 10 detect a problem in the system such as a ground fault and open the vacuum circuit breaker 10, the whole load side including the vacuum circuit breaker 10 is protected against ground faults to widen the protection range and thereby increase reliability.

In addition, since the solid-insulated main busbar 20, link busbar 21 and branch busbars 29, 30 are located in the main busbar room 5 behind the equipment room 4 to reduce the insulation distance between the busbars, the housing space is smaller and the whole switchgear can be small.

Furthermore, since the main busbar 20, link busbar 21, branch busbars 29, 30 and so on are solid-insulated, maintenance such as cleaning for prevention of short-circuit accidents due to dust adhesion is not needed, which saves labor in maintenance.

Furthermore, since the main busbar 20, link busbar 21, branch busbars 29, 30 and soon are solid-insulated, air purging for prevention of dew condensation is required only in the equipment room 4. Therefore, air purging equipment as incidental equipment can be small and the equipment cost and maintenance cost thereof can be reduced.

As mentioned so far, according to an embodiment of the present invention, the whole load side including a vacuum circuit breaker can be protected against ground faults to widen the protection range and thereby increase reliability and also thanks to the solid-insulated busbars, the insulation performance is less influenced by such factors as atmosphere, environmental condition, and altitude and the risk that the insulators contaminated by dust, salt damage, dew condensation and the like may deteriorate the insulation performance is low, ensuring good safety. In addition, the insulation distance to ground or between phases can be reduced, which offers an advantage that layout for the busbars can be done easily to save space and makes it possible to provide almost ideal distribution switchgear which meets customer needs.

Second Embodiment

Figure 6:
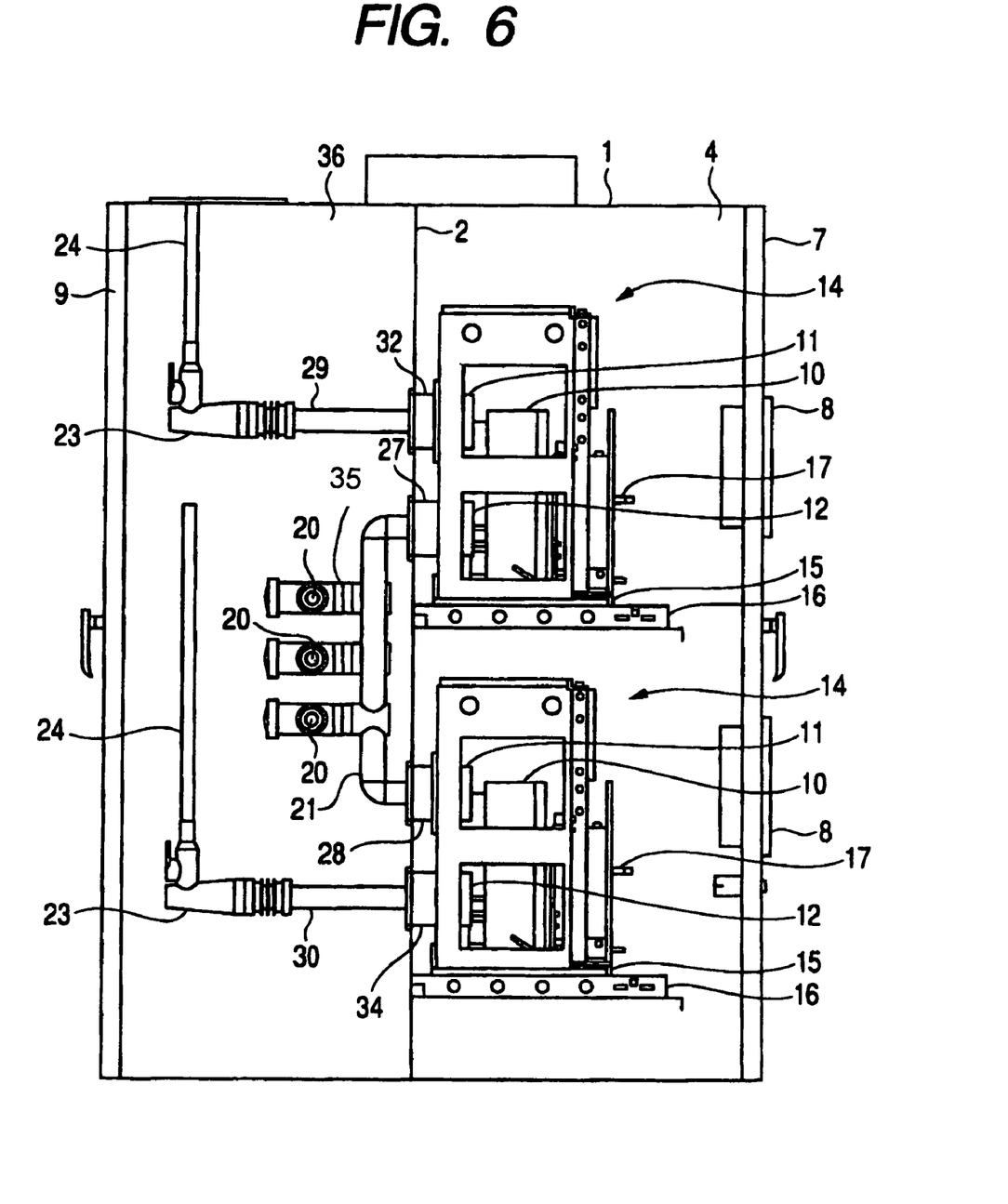
FIG. 6 is a longitudinal sectional view of distribution switchgear according to a second embodiment of the present invention.

FIG. 6 is a longitudinal sectional view showing distribution switchgear according to a second embodiment of the present invention and in FIG. 6, those designated by the same reference numerals as in FIG. 1 are the same parts.

In this embodiment, a common room 36 replaces the main busbar room and cable room in the first embodiment and this common room 36 is located behind the equipment room 4, and in this common room 36, main busbars 20, link busbars 21, branch busbars 29, 30, cable sealing ends 23 and cables 24 are disposed.

According to this embodiment, the same effect as in the first embodiment can be achieved and also due to the absence of the partition plate 3 as shown in FIG. 3, maintainability and assemblability for busbars and the like are improved.

Third Embodiment

Figure 7:
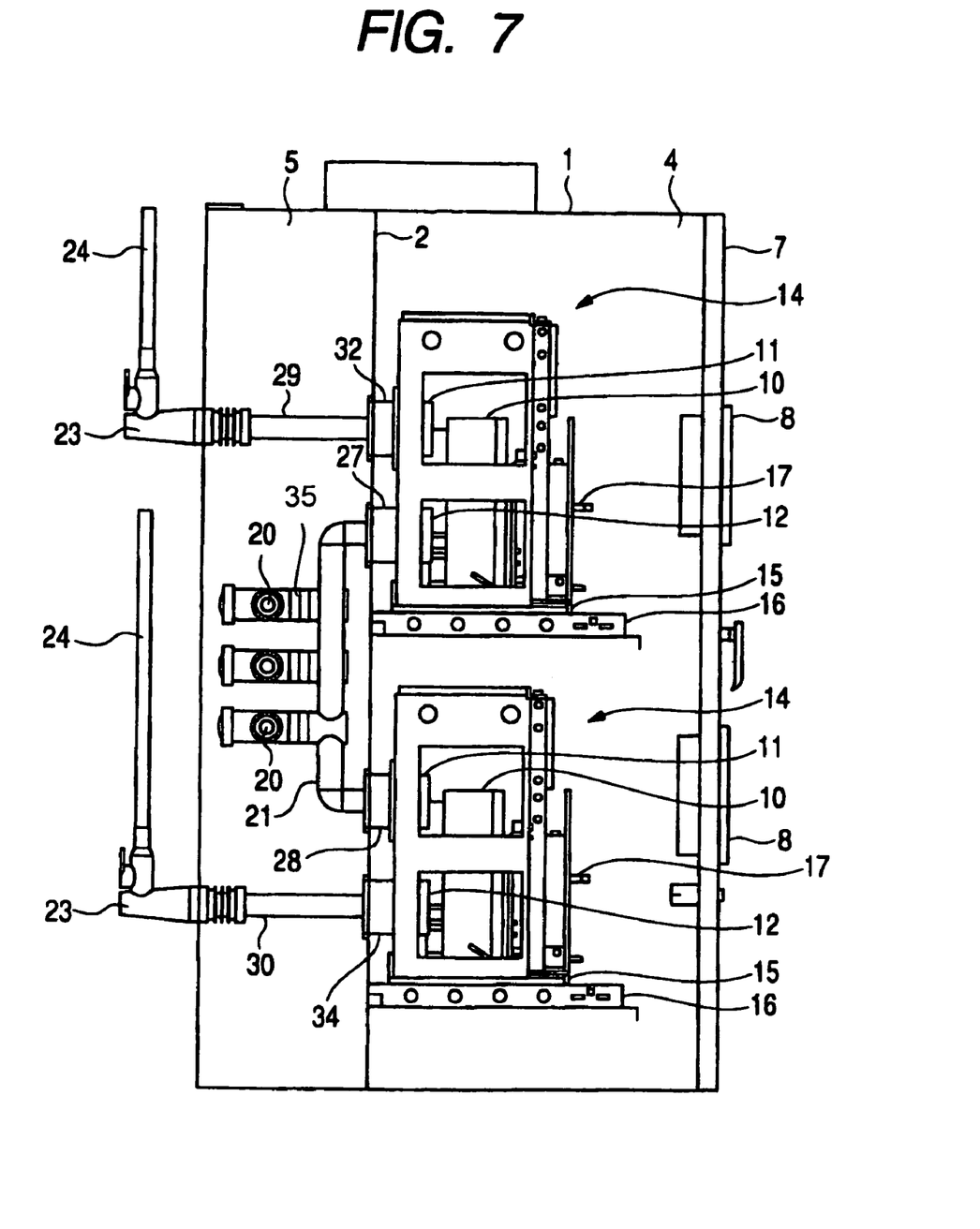
FIG. 7 is a longitudinal sectional view of a distribution switchgear according to a third embodiment of the present invention.

FIG. 7 is a longitudinal sectional view showing distribution switchgear according to a third embodiment of the present invention and in the figure, those designated by the same reference numerals as in FIG. 1 are the same parts.

In this embodiment, the cable room 6 in the first embodiment is eliminated and the cables 24 are exposed outside the housing 1. The rest of the structure is the same as in the embodiment shown in FIG. 1.

According to this embodiment, the same effect as in the above embodiments can be achieved and due to the absence of the cable room 6, the installation space is smaller, which is helpful for installation in a confined space.

Fourth Embodiment

Figure 8:
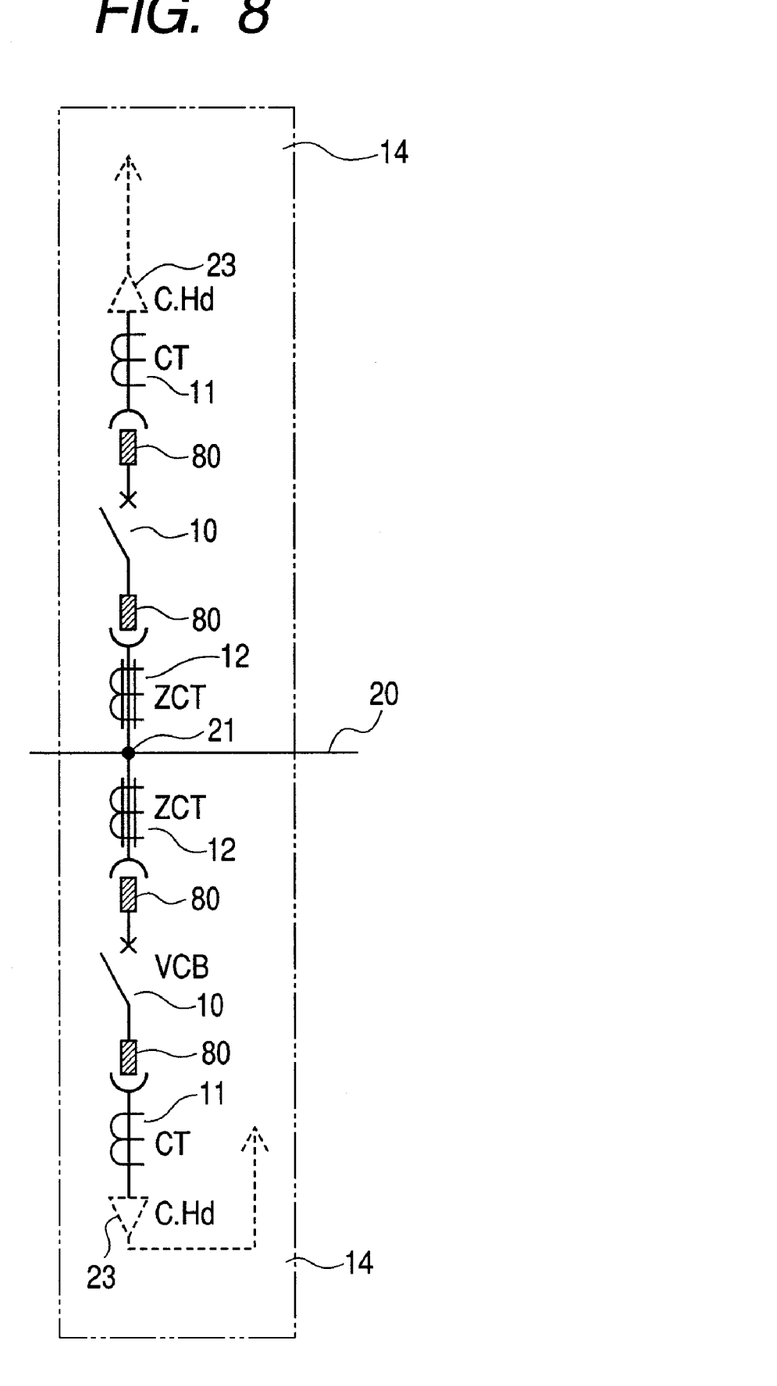
FIG. 8 is a general connection diagram of a distribution switchgear according to a fourth embodiment of the present invention.

FIG. 8 is a general connection diagram showing distribution switchgear according to a fourth embodiment of the present invention and in the figure, those designated by the same reference numerals as in FIGS. 1 to 5 are the same or equivalent parts.

In this embodiment, disconnecting parts 80 are provided on the fixed electrode side and movable electrode side of a vacuum circuit breaker 10. Like the operating mechanism of the vacuum circuit breaker 10 as mentioned above, the disconnecting part 80 is operated for disconnection through an electromagnetic operating device which combines an electromagnet and a permanent magnet. A solid lubricating bearing is used in the sliding part of the electromagnetic operating device, permitting easy greaseless maintenance.

In this embodiment, the same effect as in the above embodiments can be achieved as well.

Fifth Embodiment

Figure 9:
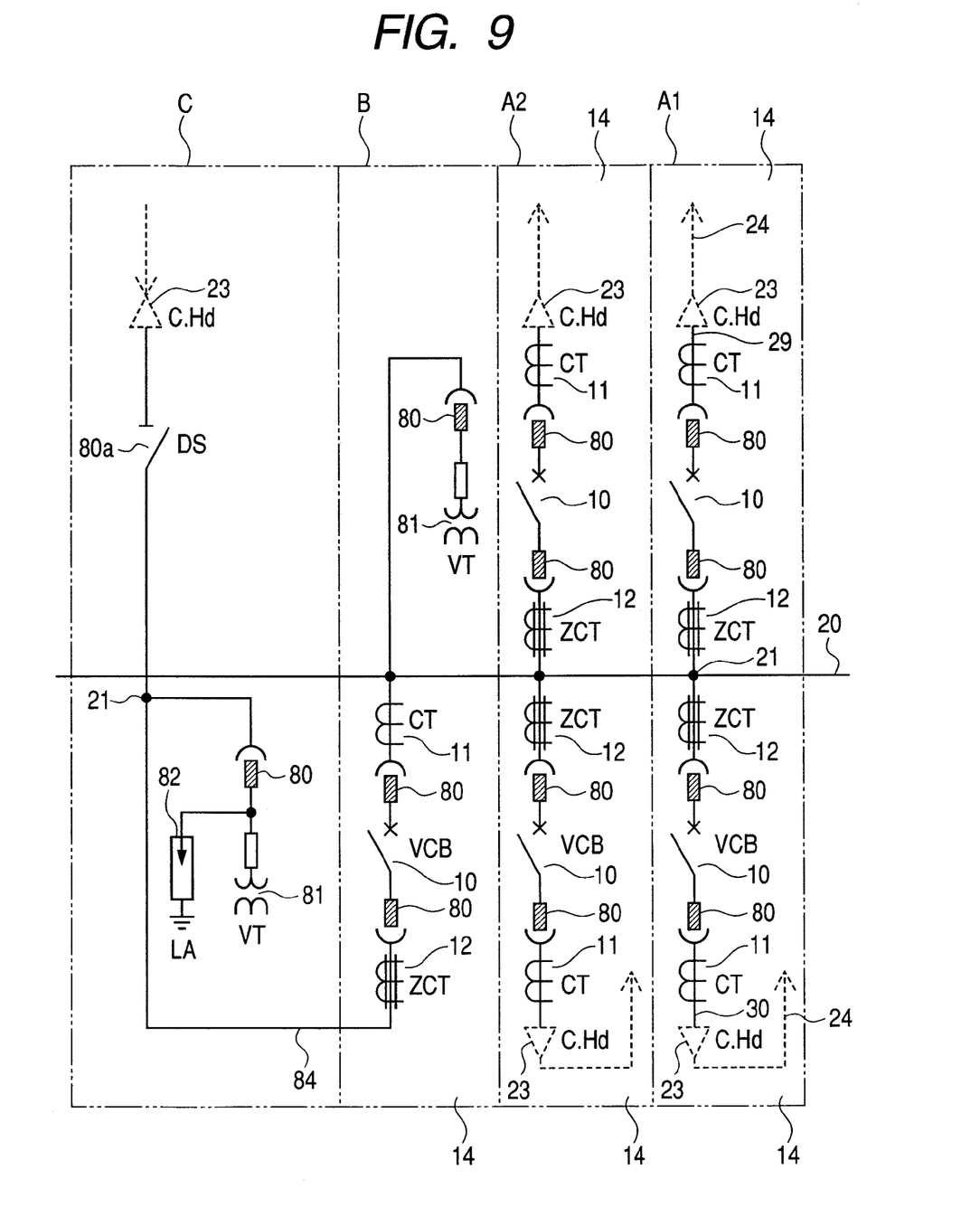
FIG. 9 is a general connection diagram of an array of panels as distribution switchgear according to a fifth embodiment of the present invention.
Figure 10:
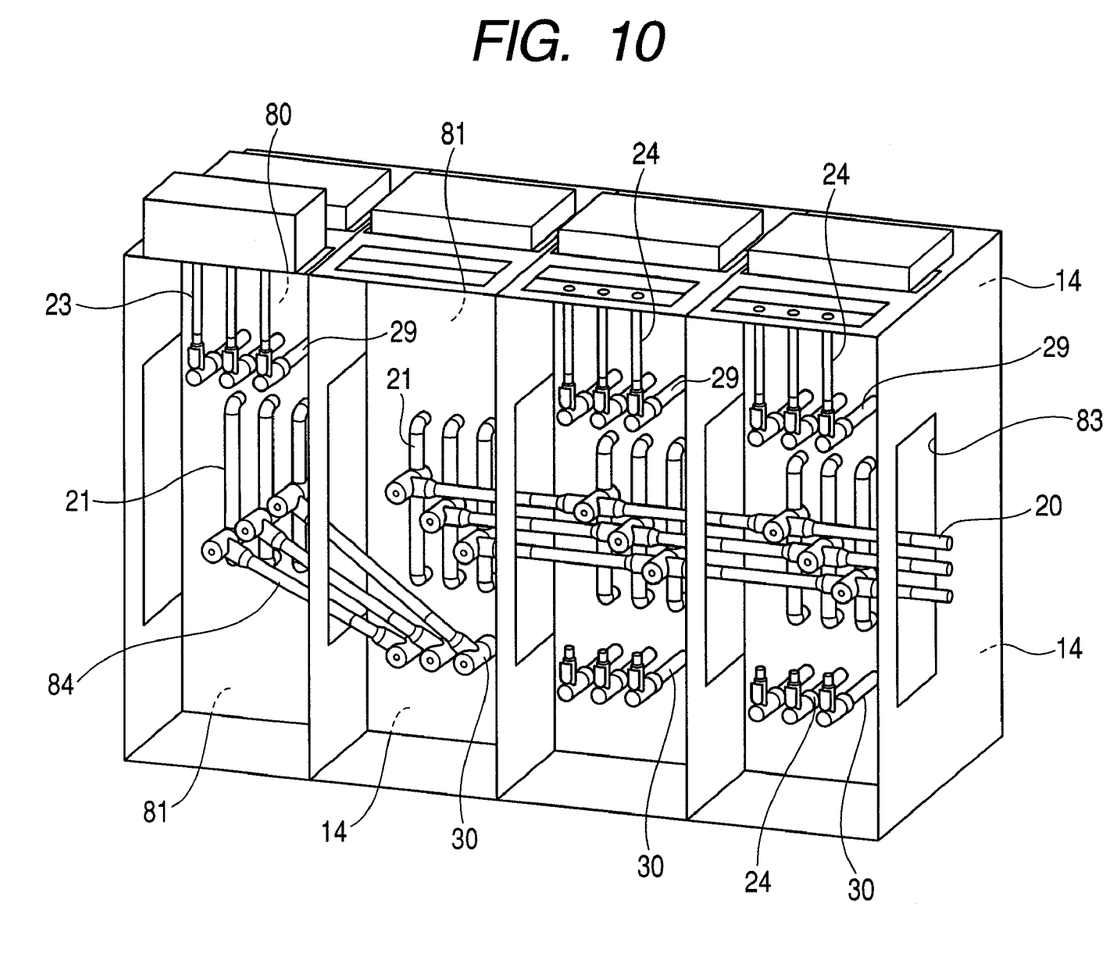
FIG. 10 is a perspective back view of an array of panels as the distribution switchgear shown in FIG. 9 according to an embodiment of the present invention.

FIGS. 9 and 10 show an example of an array of panels which embodies distribution switchgear as mentioned above according to the present invention, in which FIG. 9 is a general connection diagram thereof and FIG. 10 is a perspective view of the back thereof. In these figures, those designated by the same reference numerals as in FIGS. 1 to 5 are the same or equivalent parts.

In FIG. 9, on the right in the figure, an upper and a lower equipment unit 14, each including a vacuum circuit breaker (VCB) 10, disconnecting parts 80 on the fixed electrode and movable electrode sides of the vacuum circuit breaker 10, a current transformer (CT) 11 on the load side of the vacuum circuit breaker 10 and a zero-phase-sequence current transformer (ZCT) 12 on the power supply side of the vacuum circuit breaker 10, constitute a first panel A1 for distribution switchgear; and another first panel A2 with the same structure is placed on the left of the first panel A1; a second panel B is placed on the left of the other first panel A2; and a third panel C is placed on the left of the second panel B, thus constituting an array of panels.

The second panel B includes: an equipment unit 14, located in its lower portion, which is comprised of a vacuum circuit breaker (VCB) 10, disconnecting parts 80 on the fixed electrode and movable electrode sides of the vacuum circuit breaker 10, a current transformer (CT) 11 on the power supply side of the vacuum circuit breaker 10 and a zero-phase-sequence current transformer (ZCT) 12 on the load side of the vacuum circuit breaker 10; and a voltage transformer unit, located above the equipment unit 14, which is comprised of a voltage transformer (VT) 81 and a disconnecting part 80. The third panel C includes a voltage transformer unit, located in its lower portion, which is comprised of a voltage transformer (VT) 81, a disconnecting part 80 and a lightning protector 82 and a disconnecting unit, located above the voltage transformer unit, which is comprised of a disconnecting part 80.

As shown in FIG. 10, these first to third panels A1 to C are interconnected by main busbars 20, link busbars 21 connected with the main busbars 20, branch busbars 29, 30 connected with individual pieces of equipment, and auxiliary link busbars 84, at the back of the housing 1 through an opening 83 in a side face of the housing 1.

According to this embodiment, it is possible to shorten the construction period for transformation equipment and also substantially reduce the number of on-site man-hours for a new installation or an extension of existing equipment.

Sixth Embodiment

Figure 11:
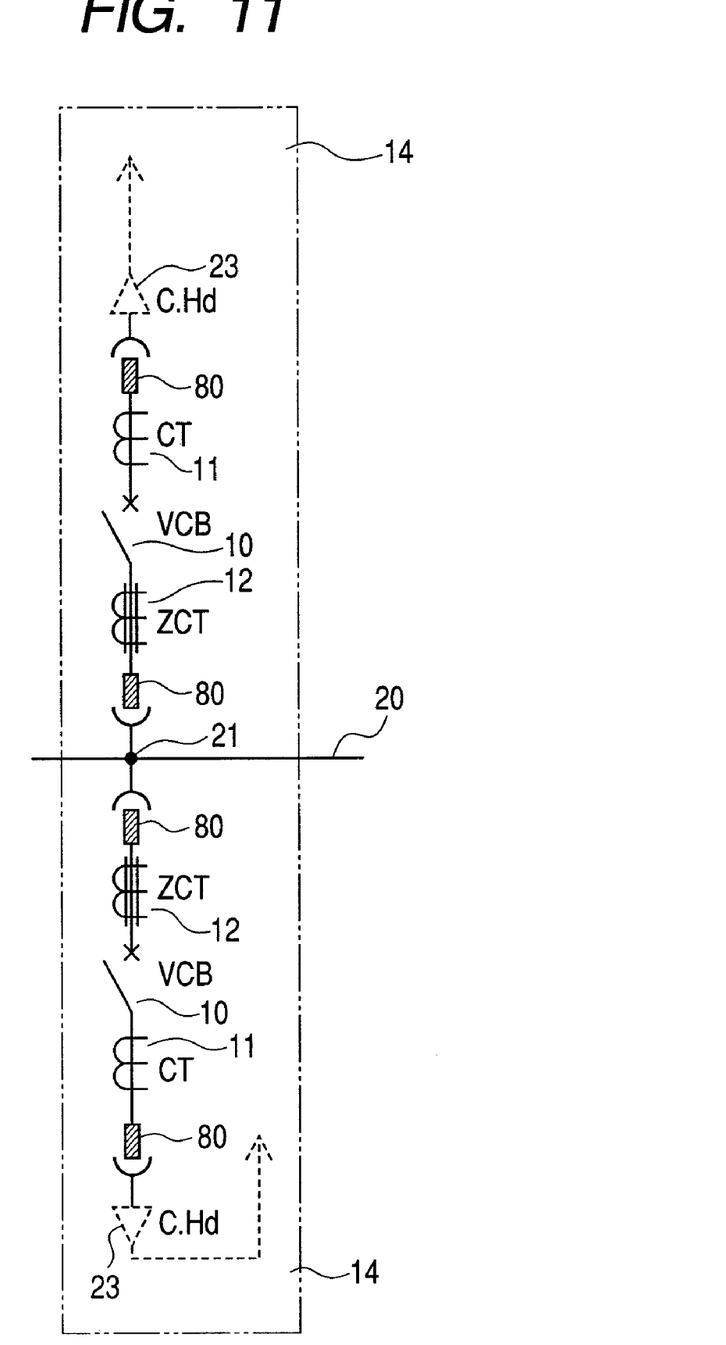
FIG. 11 is a general connection diagram of a distribution switchgear according to a sixth embodiment of the present invention.

FIG. 11 is a general connection diagram showing distribution switchgear according to a sixth embodiment of the present invention and in the figure, those designated by the same reference numerals as in FIGS. 1 to 5 are the same or equivalent parts.

In this embodiment, a current transformer (CT) 11 and a zero-phase-sequence current transformer (ZCT) 12 are located between the fixed electrode side of a vacuum circuit breaker 10 and a disconnecting part 80 and between its movable electrode side and a disconnecting part 80. Like the operating mechanism of the vacuum breaker 10 as mentioned above, the disconnecting parts 80 are also operated for disconnection through an electromagnetic operating device which combines an electromagnet and a permanent magnet. A solid lubricating bearing is used in the sliding part of the electromagnetic operating device, permitting easy greaseless maintenance.

In this embodiment, the same effect as in the above embodiments can be achieved as well.

Seventh Embodiment

Figure 12:
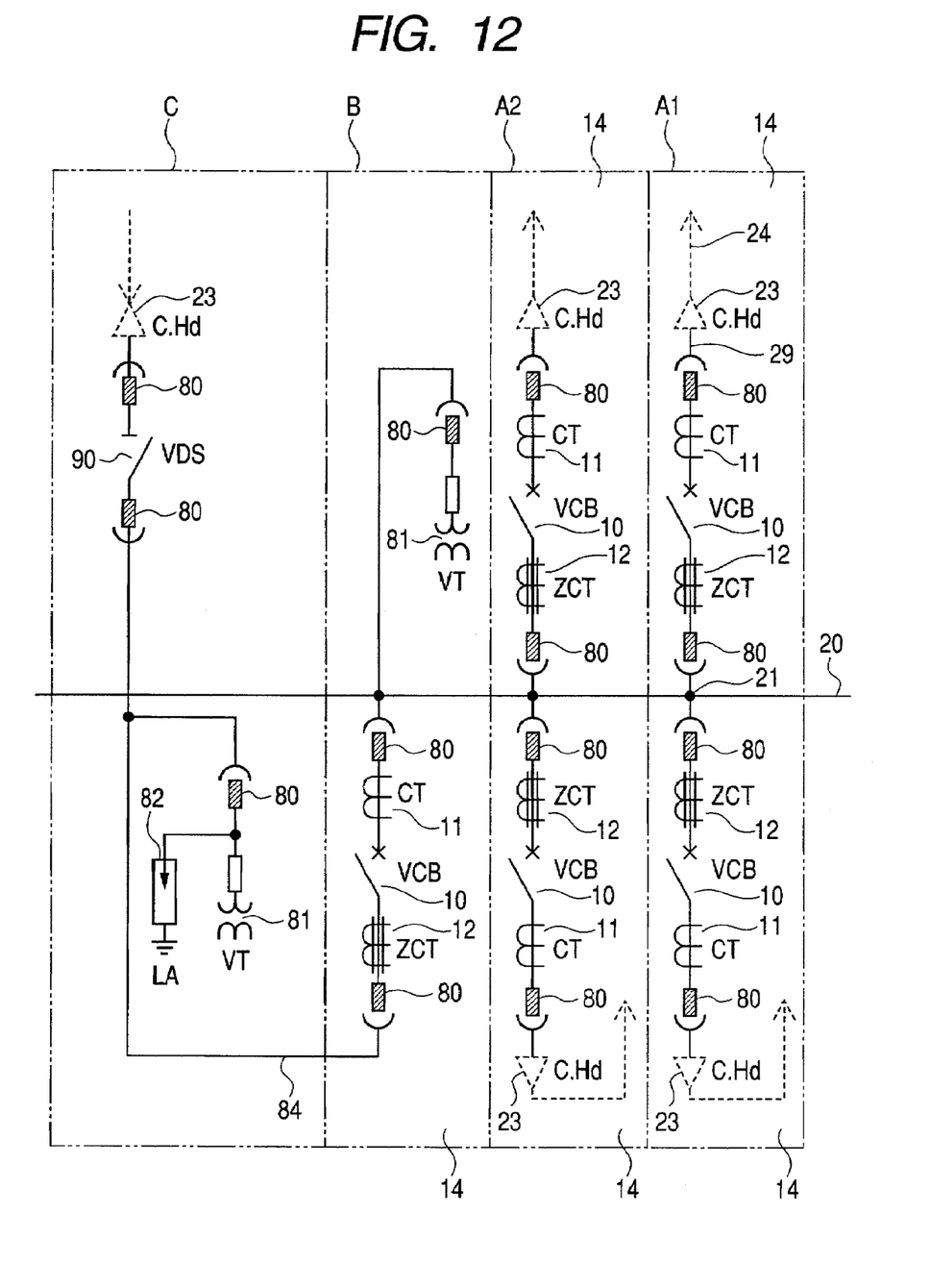
FIG. 12 is a general connection diagram of an array of panels as distribution switchgear according to a seventh embodiment of the present invention.

FIG. 12 shows an example of an array of panels which embodies distribution switchgear as mentioned above according to the present invention, which is a variation of the one shown in FIG. 9. In the figure, those designated by the same reference numerals as in FIGS. 1 to 5 are the same or equivalent parts.

In FIG. 12, on the right in the figure, an upper and a lower equipment unit 14 which each include a vacuum circuit breaker (VCB) 10, disconnecting parts 80 on the fixed electrode and movable electrode sides of the vacuum circuit breaker 10, a current transformer (CT) 11 on the load side of the vacuum circuit breaker 10 and a zero-phase-sequence current transformer (ZCT) 12 on the power supply side of the vacuum circuit breaker 10, both between the vacuum circuit breaker 10 and a disconnecting part 80, constitute a first panel A1 for distribution switchgear; and another first panel A2 with the same structure is placed on the left of the first panel A1; a second panel B is placed on the left of the other first panel A2; and a third panel C is placed on the left of the second panel B, thus constituting an array of panels.

The second panel B includes: an equipment unit 14, located in its lower portion, which is comprised of a vacuum circuit breaker (VCB) 10, disconnecting parts 80 on the fixed electrode and movable electrode sides of the vacuum circuit breaker 10, a current transformer (CT) 11 on the power supply side of the vacuum circuit breaker 10 and a zero-phase-sequence current transformer (ZCT) 12 on the load side of the vacuum circuit breaker 10, both between the vacuum circuit breaker 10 and a disconnecting part 80; and a voltage transformer unit, located above the equipment unit 14, which is comprised of a voltage transformer (VT) 81 and a disconnecting part 80. The third panel C includes a voltage transformer unit, located in its lower portion, which is comprised of a voltage transformer (VT) 81, a disconnecting part 80 and a lightning protector 82, and a disconnector unit, located above the voltage transformer unit, which is comprised of a vacuum circuit breaker 90 and disconnectors 80*a* on the fixed electrode and movable electrode sides of the vacuum circuit breaker 90.

Like those shown above in FIG. 10, these first to third panels A1 to C are interconnected by main busbars 20, link busbars 21 connected with the main busbars 20, branch busbars 29, 30 connected with individual pieces of equipment, and auxiliary link busbars 84, at the back of the housing 1 through an opening 83 in a side face of the housing 1.

According to this embodiment, it is possible to shorten the construction period for transformation equipment and also substantially reduce the number of on-site man-hours for a new installation or an extension of existing equipment.

What is claimed is:

1. A distribution switchgear comprising;
an equipment room and a main busbar room, which are formed in a distribution panel housing on its front side and on its back side respectively by partitioning;
equipment units disposed in the equipment room, each comprising a vacuum circuit breaker, a current transformer on a load side of the circuit breaker and a zero-phase-sequence current transformer on a power supply side of the circuit breaker, the equipment units being vertically arranged;
a solid-insulated main busbar being disposed along a horizontal direction of the housing in the main busbar room,
a solid-insulated link busbar being vertically disposed in the main busbar room to be connected with the main busbar and connected with one side of each of the equipment units, and
a solid-insulated branch busbar connected with the other side of each of the equipment units,
wherein the vacuum circuit breaker comprises an electromagnet operating device with an electromagnet, a permanent magnet and a solid lubricating bearing used for a sliding part of the electromagnetic operating device.

2. The distribution switchgear as described in claim 1, wherein the equipment unit further includes disconnectors on a fixed electrode side and a movable electrode side of the vacuum circuit breaker,
wherein each of the disconnectors comprises an electromagnetic operating device with an electromagnet a permanent magnet and a solid lubricating bearing used for the electromagnetic operating device's sliding part.

3. The distribution switchgear as defined in claim 2, wherein the equipment unit can be connected to, or disconnected from, the main busbar through an air bushing and is housed in the housing on the front side of the housing in a way that it can be drawn out.

4. The distribution switchgear as described in claim 1, wherein the surface of the main busbar, the link busbar, and the branch busbar is covered by an earthed layer.

5. The distribution switchgear as defined in claim 1, wherein the equipment unit can be connected to, or disconnected from, the main busbar through an air bushing and is housed in the housing on the front side of the housing in a way that it can be drawn out.

6. The distribution switchgear as described in claim 1, wherein a protective control unit is mounted on a front door of the housing.

7. The distribution switchgear as described in claim 1, wherein the current transformer is of the multi current ratio type which can cope with plural rated currents.

8. The distribution switchgear as described in claim 1, wherein the solid-insulated link busbar is vertically disposed in the main busbar room so as to cross the solid-insulated main busbar with grade separation, and the solid-insulated link busbar is connected with the main busbar via a connecting busbar; and
wherein the connecting busbar has one end connected with the solid-insulated link busbar and the other end clamped to the solid-insulated main busbar.

9. A distribution switchgear comprising;
an equipment room and a main busbar room and further a cable room are formed in a distribution panel housing on its front side of and on its back side and behind the main busbar room respectively by partitioning;
equipment units, each comprising a vacuum circuit breaker, a current transformer on a load side of the circuit breaker and a zero-phase-sequence current transformer on a power supply side of the circuit breaker, the equipment units being arranged vertically in the equipment room;
a solid-insulated main busbar being disposed along a horizontal direction of the housing in the main busbar room,
a solid-insulated link busbar being vertically disposed in the main busbar room to be connected with the main busbar and connected with one side of each of the equipment units,
a solid-insulated branch busbar with one end connected with the other side of each of the equipment units and the other end led into the cable room, the solid-insulated branch busbar being disposed in the main busbar room together with the solid-insulated main busbar and the solid-insulated link busbar; and
a solid-insulated cable connected with the other end of the branch busbar through a cable sealing end in the cable room,
wherein the vacuum circuit breaker comprises an electromagnetic operating device with an electromagnet, a permanent magnet and a solid lubricating bearing used for a sliding part of the electromagnetic operating device.

10. The distribution switchgear as described in claim 9, wherein the equipment unit further includes disconnectors on a fixed electrode side and a movable electrode side of the vacuum circuit breaker,
wherein each of the disconnectors comprises an electromagnetic operating device with an electromagnet, a permanent magnet and a solid lubricating bearing used for the electromagnetic operating device's sliding part.

11. The distribution switchgear as described in claim 10, wherein the surface of the main busbar, the link busbar, the branch busbar or a cable is covered by an earthed layer.

12. The distribution switchgear as defined in claim 10, wherein the equipment unit can be connected to, or disconnected from, the main busbar through an air bushing and is housed in the housing on the front side of the housing in a way that it can be drawn out.

13. The distribution switchgear as described in claim 10, wherein a protective control unit is mounted on a front door of the housing.

14. The distribution switchgear as described in claim 10, wherein the current transformer is of the multi current ratio type which can cope with plural rated currents.

15. The distribution switchgear as described in claim 9, wherein the surface of the main busbar, the link busbar, the branch busbar and a cable is covered by an earthed layer.

16. The distribution switchgear as defined in claim 9, wherein the equipment unit can be connected to, or disconnected from, the main busbar through an air bushing and is housed in the housing on the front side of the housing in a way that it can be drawn out.

17. The distribution switchgear as described in claim 9, wherein a protective control unit is mounted on a front door of the housing.

18. The distribution switchgear as described in claim 9, wherein the current transformer is of the multi current ratio type which can cope with plural rated currents.

19. The distribution switchgear as described in claim 9,
wherein the solid-insulated link busbar is vertically disposed in the main busbar room so as to cross the solid-insulated main busbar with grade separation, and the solid-insulated link busbar is connected with the main busbar via a connecting busbar; and
wherein the connecting busbar has one end connected with the solid-insulated link busbar and the other end clamped to the solid-insulated main busbar.

20. A distribution switchgear comprising:

an equipment room and a main busbar room are formed in a distribution panel housing on its front side of and on its back side respectively by partitioning;

an equipment unit comprising a circuit breaker, a current transformer on a load side of the circuit breaker, a zero-phase-sequence current transformer on a power supply side of the circuit breaker and a disconnector, a voltage transformer unit having a voltage transformer and a disconnector;

the equipment unit and the voltage transformer unit being vertically arranged in the equipment room;

a solid-insulated main busbar being disposed along a horizontal direction of the housing in the main busbar room, a solid-insulated link busbar being vertically disposed in the main busbar room to be connected with the main busbar and connected with one side of the equipment unit and the voltage transformer unit, and a solid-insulated branch busbar connected with the other side of the equipment unit in the main busbar room, wherein each of the vacuum circuit breaker and disconnectors comprises an electromagnetic operating device with an electromagnet, a permanent magnet and a solid lubricating bearing used for a sliding part of the electromagnetic operating device.

21. The distribution switchgear as described in claim 20, wherein the solid-insulated link busbar is vertically disposed in the main busbar room so as to cross the solid-insulated main busbar with grade separation, and the solid-insulated link busbar is connected with the main busbar via a connecting busbar; and wherein the connecting busbar has one end connected with the solid-insulated link busbar and the other end clamped to the solid-insulated main busbar.

22. A distribution switchgear comprising an array of panels disposed side by side in a housing which are:

a first panel in which two equipment units each comprised of a circuit breaker, a current transformer on a load side of the circuit breaker and a zero-phase-sequence current transformer on a power supply side of the circuit breaker are vertically disposed;

a second panel in which an equipment unit comprised of a circuit breaker, a current transformer on a load side of the circuit breaker and a zero-phase-sequence current transformer on a power supply side of the circuit breaker, and a voltage transformer unit having a voltage transformer are vertically disposed; and a third panel in which a voltage transformer unit having a voltage transformer and a lightning protector and a disconnector unit having a disconnector are vertically disposed, wherein these panels are interconnected by a solid-insulated main busbar disposed along the housing's width direction, a solid-insulated link busbar connected with one side of each of the units and a branch busbar connected with the other side of each of the units.

23. The distribution switchgear as described in claim 22, wherein the disconnector of the third panel is a vacuum disconnector.

24. The distribution switchgear as described in claim 22, wherein the circuit breaker is a vacuum circuit breaker.

* * * * *